(12) United States Patent
Furuki et al.

(10) Patent No.: US 8,330,454 B2
(45) Date of Patent: Dec. 11, 2012

(54) POSITION DETECTION MAGNET AND POSITION DETECTION APPARATUS

(75) Inventors: Shigeru Furuki, Miyagi-ken (JP); Satoru Sunada, Saitama-ken (JP); Hiroyuki Nakayama, Saitama-ken (JP); Kenji Okamoto, Saitama-ken (JP)

(73) Assignees: Alps Electric Co., Ltd., Tokyo (JP); Honda Motor Co., Ltd., Tokyo (JP)

( * ) Notice: Subject to any disclaimer, the term of this patent is extended or adjusted under 35 U.S.C. 154(b) by 445 days.

(21) Appl. No.: 12/578,083

(22) Filed: Oct. 13, 2009

(65) Prior Publication Data

US 2010/0090689 A1 Apr. 15, 2010

(30) Foreign Application Priority Data

Oct. 14, 2008 (JP) .................................. 2008-265577

(51) Int. Cl.
*G01B 7/14* (2006.01)

(52) U.S. Cl. .......... 324/207.22; 324/207.11; 324/207.24

(58) Field of Classification Search ............... 324/207.22
See application file for complete search history.

(56) References Cited

U.S. PATENT DOCUMENTS

| 4,596,971 | A | * | 6/1986 | Hirabayashi et al. | 335/205 |
| 5,684,344 | A | * | 11/1997 | Takei | 310/12.21 |
| 7,132,936 | B1 | * | 11/2006 | Norton | 340/440 |
| 2010/0294656 | A1 | * | 11/2010 | Ikeda et al. | 204/298.11 |
| 2010/0321008 | A1 | * | 12/2010 | Mita et al. | 324/207.25 |

FOREIGN PATENT DOCUMENTS

JP 2007-223384 9/2007

OTHER PUBLICATIONS

Koji, Uchida, JP 2007-223384, JPO Machine Translation, p. 1-23.*
Mita, JP 2008-27636 Patent Application, JPO Machine Translation, p. 1-41.*

* cited by examiner

*Primary Examiner* — Thomas Valone
(74) *Attorney, Agent, or Firm* — Beyer Law Group LLP

(57) ABSTRACT

A position detection apparatus includes a position detection target member, a magnet that moves in accordance with movement of the position detection target member, and a plurality of magnetic detectors provided on a surface opposite a movement plane of the magnet. A flat yoke is provided on the reverse face of the magnet. The magnetic polarity of a peripheral side part of the magnet is opposite to the magnetic polarity of a center part thereof. The peripheral side part is formed at a regional range that can be defined on the basis of a predetermined distance(s) measured from a side edge of the yoke.

12 Claims, 7 Drawing Sheets

PRIOR ART

PRIOR ART

POSITION DETECTION MAGNET AND POSITION DETECTION APPARATUS

CLAIM OF PRIORITY

This application claims benefit of the Japanese Patent Application No. 2008-265577 filed on Oct. 14, 2008, which is hereby incorporated by reference.

BACKGROUND OF THE INVENTION

1. Field of the Invention

The present invention relates to a position detection magnet that is provided on a yoke, and a position detection apparatus that uses the position detection magnet for detection.

2. Description of the Related Art

A shifting device that utilizes a position detection magnet for vehicular application is known. An example of such a vehicular shifting device is disclosed in Japanese Unexamined Patent Application Publication No. 2007-223384.

Though a magnetic-type position detection apparatus, which uses a magnet for positional detection, is used not only in a vehicular shifting device but also in various devices such as a joystick input device, a sliding-type four direction switch, and the like, a position detection apparatus with a position detection magnet for vehicular shifting application is explained below with reference to FIG. 11. A shift lever 1 can be moved with a shift movement support member 2 as a fulcrum of the movement. A magnet holder 3 is fixed to the front end of the shift lever 1. A gearshift knob 4, which is operated by a driver, is fixed to the other opposite end of the shift lever 1. A cover plate 5 has a guiding opening that is formed along the shift movement paths of the shift lever 1. A magnet (denoted as 16 in related art and as 6 according to an exemplary embodiment of the present invention) that has the shape of a flat plate is attached to the magnet holder 3. A substrate 7 is provided opposite the magnet 16 with a predetermined clearance between the magnet 16 and the substrate 7. A plurality of magnetic detection elements 8 is provided on the substrate 7. A magnet movement mechanism that is not illustrated in the drawing enables the magnet 16 to move on a virtual plane that is parallel to the surface of the substrate 7. When a driver operates the gearshift knob 4, the position of the magnet 16 with respect to the magnetic detection elements 8 (such as a Hall element or the like) changes in synchronization with the movement position of the gearshift knob 4. Due to the change in the position of the magnet 16, the magnetic detection state of each of the magnetic detection elements 8, which detect the magnet 16, also changes. As a result, a position detection signal in accordance with the detection state is outputted. The operation position of the gearshift knob 4 is judged on the basis of the position detection signal. Then, a resultant shift signal is outputted to a gear-changing device, etc. of the vehicle.

A magnet of related art used in the position detection apparatus explained above has a structure illustrated in FIG. 12. An yoke 19 that has a bent shape to surround the sides of the magnet 16 is bonded to the reverse face of the magnet 16. The magnet 16 has the shape of a flat plate. The position of the related-art magnet (16) illustrated in FIG. 12 is indirectly determined by means of side parts 19a of the yoke 19 when fixed to the magnet holder 3. Therefore, in the position detection apparatus having the above structure, the positional precision of the magnet 16 with respect to the yoke 19 greatly affects the detection accuracy of the position detection apparatus as a whole. The reason why the detection accuracy of the entire position detection apparatus is greatly affected thereby is explained below.

The yoke 19 illustrated in FIG. 12 has a base part 19b in addition to the side parts 19a. As illustrated in FIG. 13, when the structure of the magnet 16 and the yoke 19 illustrated in FIG. 12 is adopted, magnetic lines of force formed by the magnet 16 converge at the side parts 19a of the yoke 19 because of the presence of the side parts 19a and the base part 19b. If the yoke 19 were not attached to the magnet 16, magnetic lines of force (magnetic field) that exit from the surface (N-pole surface) of the magnet 16 would take a circuitous route in the air over the side surfaces of the magnet 16 to enter the back (S-pole surface) thereof. However, since the yoke 19 having high magnetic permeability is provided, at the back of the magnet 16, the base part 19b of the yoke 19 shuts off magnetic lines of force coming toward the S poles. In addition, a magnetic path that guides magnetic lines of force is formed in the side parts 19a and the base part 19b. Therefore, magnetic lines of force flowing out from the surface of the magnet 16 converge at the side parts 19a of the yoke 19, which are close to the N poles of the magnet 16. Then, the magnetic lines of force enter the S poles of the magnet 16 through the base part 19b of the yoke 19.

Therefore, when the magnet 16 is used in a position detection apparatus, the borderline of the output level 0V of a magnetic detection element such as a Hall element or the like extends from the border between magnet 16 and the side part 19a of the yoke 19 as a line (or a plane if viewed in three dimensions) that is, roughly speaking, perpendicular to the surface of the magnet 16 as illustrated in the drawing. The borderline of the output level 0V of a magnetic detection element such as a Hall element is a border at which the detection state of the magnetic detection element changes over from "detected" to "undetected". Since the borderline of the output level 0V is roughly perpendicular thereto, a change in the detection state of the magnetic detection element in response to the movement of the magnet 16 in directions including X direction is very sensitive. Therefore, high position detection precision is ensured. In the drawing, the borderline of the Hall output level 0V means the output level 0V of the Hall element as the magnetic detection element.

The yoke 19 and the magnet 16 are bonded to each other to make up a single bonded member. It is inevitable to design a slight dimension difference between the X-directional width of the magnet 16 and the X-directional inner distance between one of the side parts 19a of the yoke 19 and the other as a margin for the purpose of fixing the magnet 16 between the side parts 19a of the yoke 19 easily. That is, a clearance is necessary for the manufacturing reason. Due to the presence of the clearance, when the yoke 19 and the magnet 16 are bonded to each other, the X-directional position of the magnet 16 with respect to the yoke 19 will be shifted from the supposed position. This means that a gap between the side part 19a of the yoke 19 and the side part of the magnet 16 varies. In addition, the erection dimension (in Z direction) of the side part 19a varies due to limited machining accuracy in the working of the side part 19a of the yoke 19. Moreover, the amount of an adhesive used for the bonding of the yoke 19 and the magnet 16 also varies. For these reasons, the relative positions of the side parts 19a of the yoke 19 and the side parts of the magnet 16 vary not only in the X direction but also in the Z direction. The positional relationship varies from one bonded piece made up of the magnet 16 and the yoke 19 to another as individual differences. In addition to the individual differences, the positional relationship varies from one magnet-peripheral area to another even in each single bonded member made up of the magnet 16 and the yoke 19. The variation explained above affects the X-directional position of the borderline of the Hall output level 0V and, in addition, affects perpendicularity to the surface of the magnet 16.

The magnet 16 that is bonded to the yoke 19 to make up a single bonded member is mounted onto the magnet holder 3 through the fixation of the yoke 19 to the magnet holder 3. When the yoke 19 is fixed to the magnet holder 3, the yoke 19 is subjected to positioning. However, because of variation that occurs in the process of bonding the yoke 19 and the magnet 16 to each other as explained above, the position of the borderline of the Hall output level 0V varies. For this reason, even in a case where the yoke 19 is fixed to the magnet holder 3 at an accurate position, the borderline of the Hall output level 0V varies with respect to the magnet holder 3. The position detection apparatus explained above detects the operation position of the gearshift knob 4 on the basis of the detected position of the magnet 16 mounted to the magnet holder 3. Therefore, if the borderline of the Hall output level 0V varies with respect to the magnet holder 3, the detection accuracy of the position detection apparatus decreases.

SUMMARY OF THE INVENTION

An advantage of some aspects of the invention is to provide a magnet that features high position detection precision and a position detection apparatus that uses the magnet for detection.

A position detection magnet according to an aspect of the invention is fixed to a surface of a flat yoke for magnetic loss reduction. The position detection magnet includes a center part and a peripheral side part. The peripheral side part is formed around the center part. The magnetic polarity of the peripheral side part is opposite to the magnetic polarity of the center part.

A position detection apparatus according to an aspect of the invention includes: a position detection target member; a magnet that moves in accordance with movement of the position detection target member; and a magnetic detector that is provided on a surface opposite a movement plane of the magnet, wherein a surface of the magnet is in contact with a surface of a flat yoke for magnetic loss reduction, the magnet includes a center part and a peripheral side part that is formed around the center part, and magnetic polarity of the peripheral side part is opposite to magnetic polarity of the center part.

In the structure of the position detection magnet and the position detection apparatus according to an aspect of the invention, it is preferable that a boundary between the peripheral side part and the center part should lie at a predetermined distance from an end of the yoke. In the structure of the position detection apparatus according to an aspect of the invention, it is preferable that the center part of the magnet and the peripheral side part thereof should be magnetized in a fixed state in which the magnet is fixed to the yoke and in an aligned state in which the yoke is aligned on a magnetizing tool. In addition, the magnet should preferably have a surface that is perpendicular to a direction of movement of the magnet.

Precise position alignment for the bonding, or fixation by other means, of the magnet to the yoke is not necessary. Precise working of the ends of the yoke is also not necessary. Therefore, it is possible to provide a magnet that achieves high position detection precision and is easy to manufacture. In addition, it is possible to provide a position detection apparatus that utilizes such a magnet to achieve high position detection precision.

DESCRIPTION OF THE PREFERRED EMBODIMENTS

Figure 1:
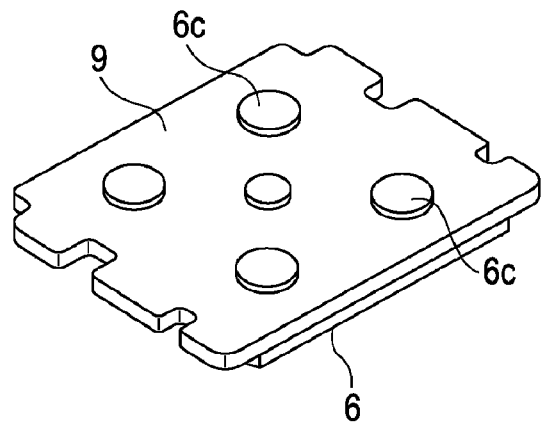
FIG. 1 is a perspective view that schematically illustrates an example of a position detection magnet according to an embodiment of the invention.
Figure 2:
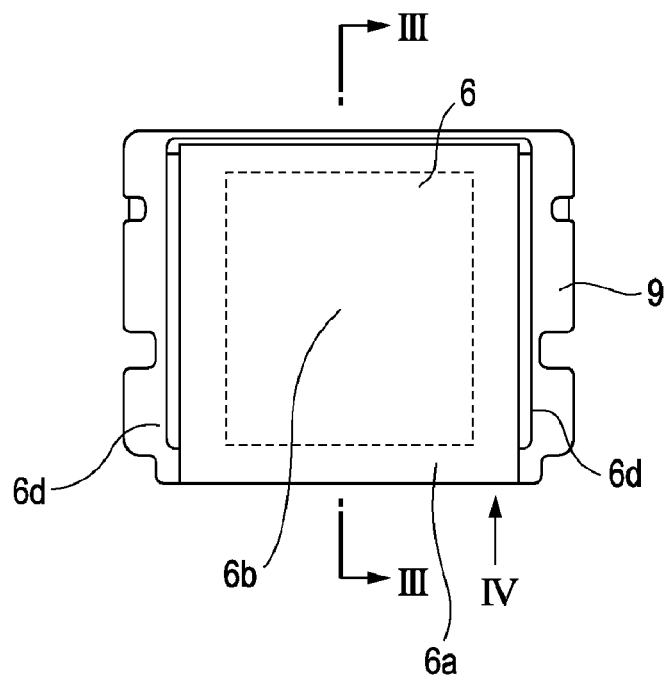
FIG. 2 is a plan view that schematically illustrates an example of the position detection magnet according to an embodiment of the invention, which is viewed from a magnet side.
Figure 3:
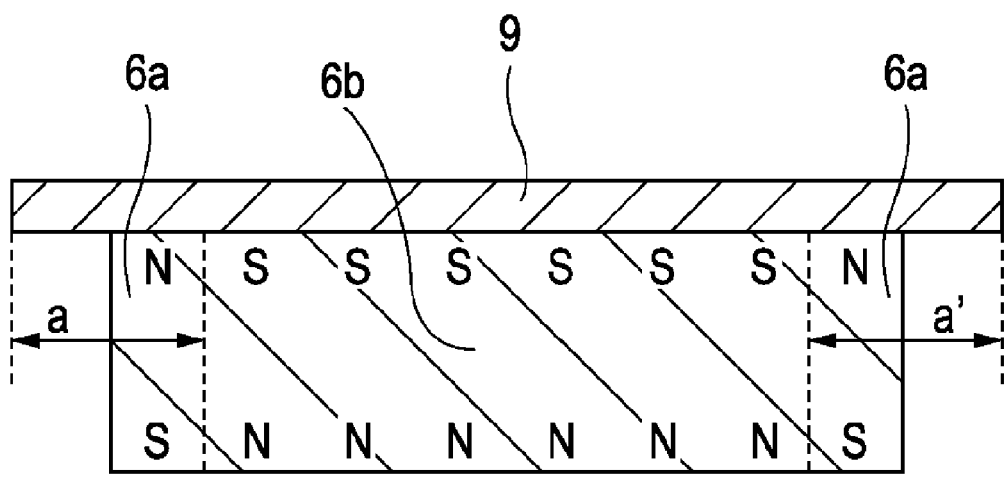
FIG. 3 is a sectional view taken along the line III-III of FIG. 2.
Figure 4:
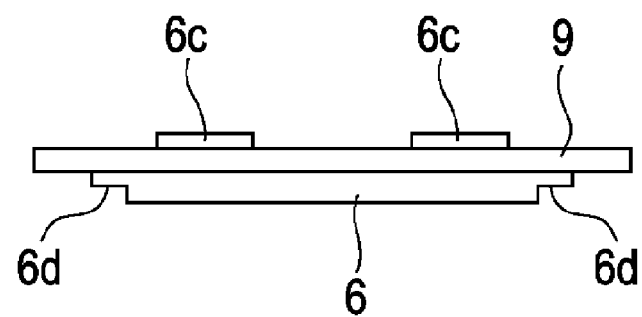
FIG. 4 is a side view observed in the direction of IV shown in FIG. 2.
Figure 5:
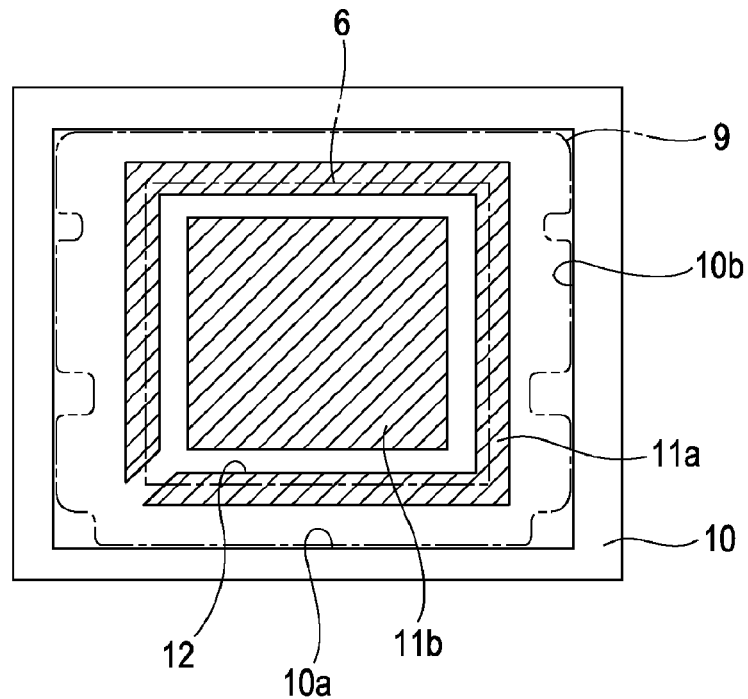
FIG. 5 is a plan view that schematically illustrates an example of an yoke positioned on a magnetizing tool according to an embodiment of the invention.
Figure 6:
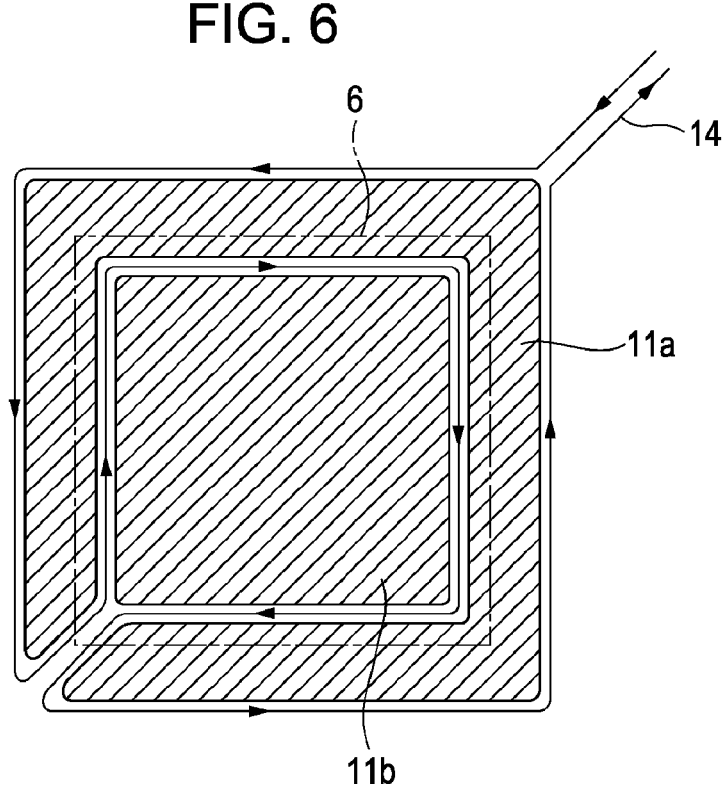
FIG. 6 is a diagram that schematically illustrates an example of a magnetizing coil according to an embodiment of the invention.
Figure 7:
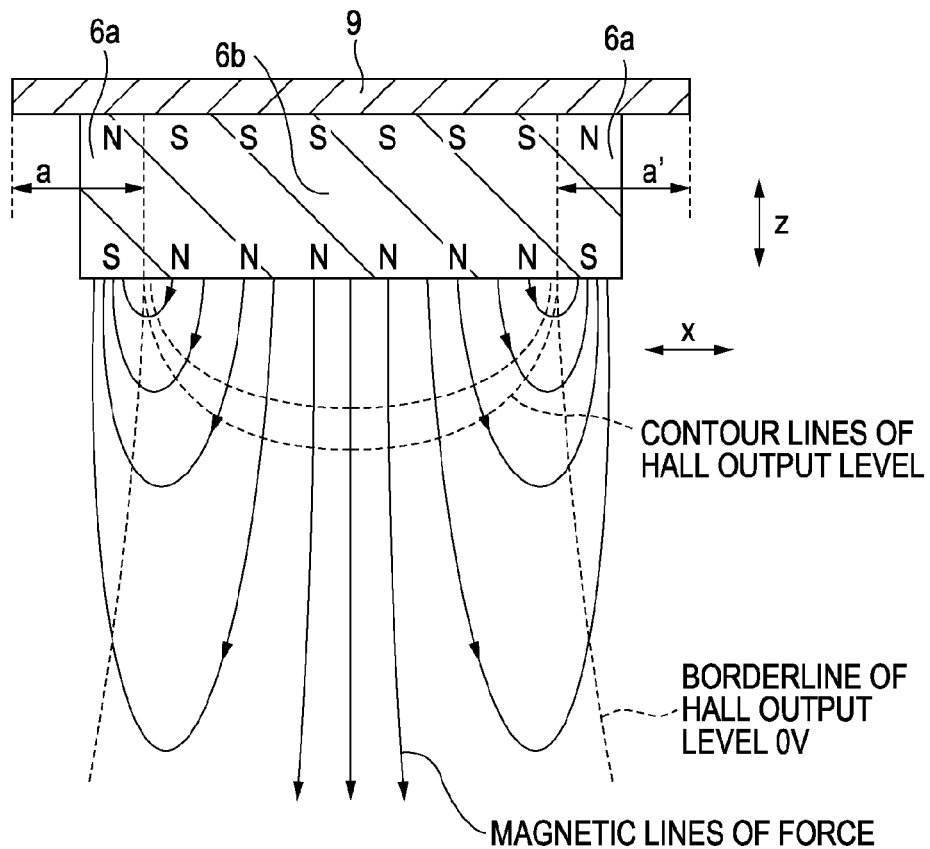
FIG. 7 is a diagram that explains the detection accuracy of the position detection magnet according to an embodiment of the invention.
Figure 8:
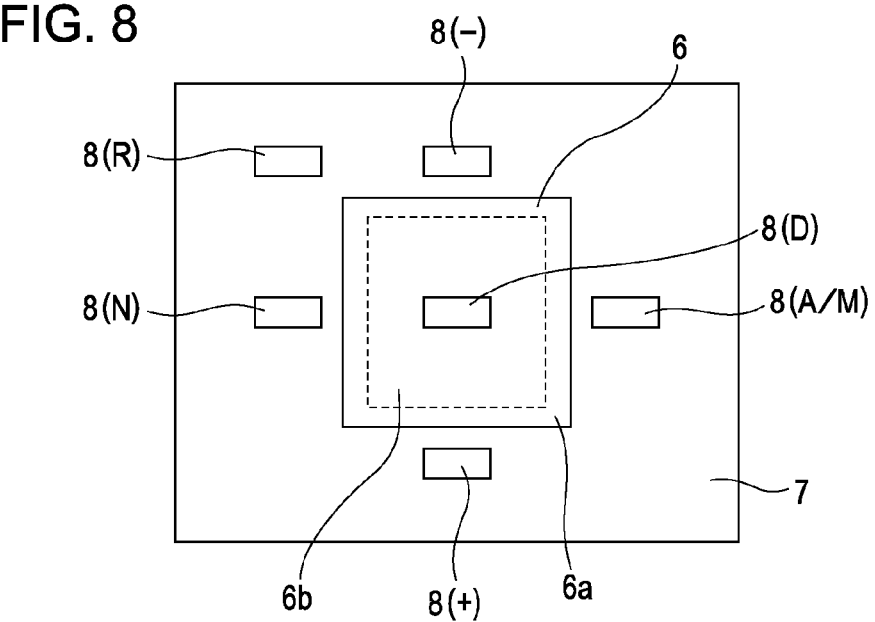
FIG. 8 is a diagram that schematically illustrates an example of the layout of magnetic detection elements in a position detection apparatus according to an embodiment of the invention.
Figure 9:
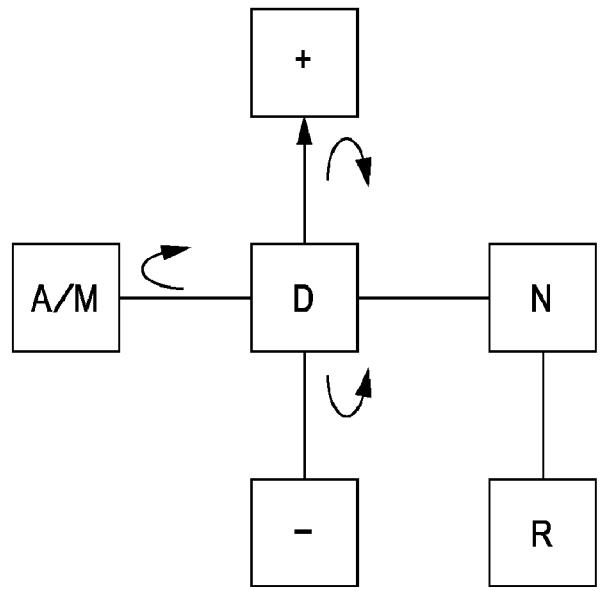
FIG. 9 is a diagram that schematically illustrates a position detection example in a case where the layout of the magnetic detection elements according to an embodiment of the invention is adopted.
Figure 10:
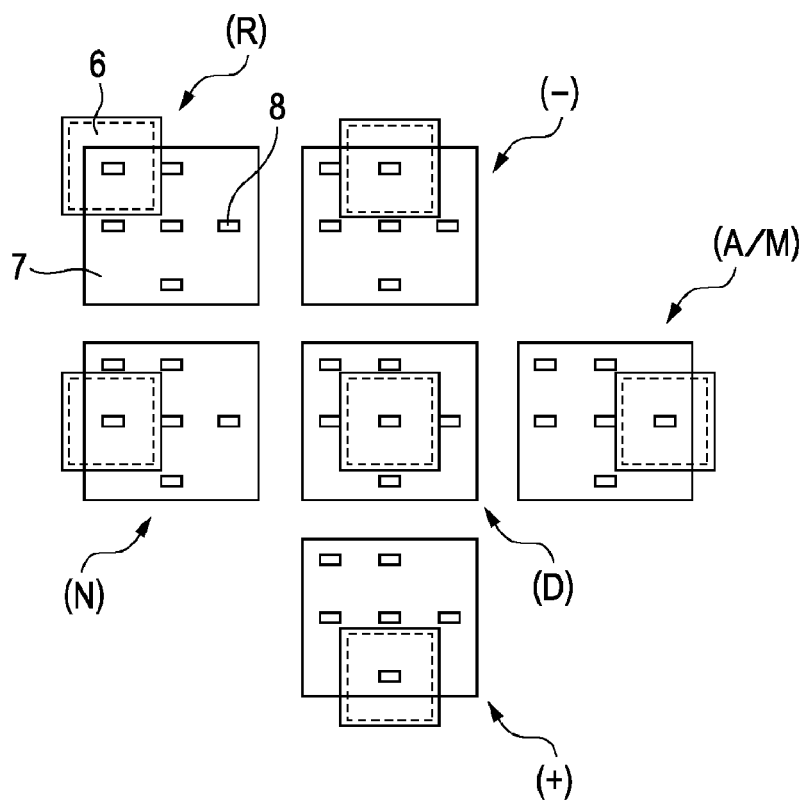
FIG. 10 is a diagram that schematically illustrates an example of the layout of vehicular shift positions according to an embodiment of the invention.

With reference to FIGS. 1 to 10, a position detection magnet that is provided on an yoke as well as a position detection apparatus that uses the position detection magnet for detection is explained below as an exemplary embodiment of the invention. FIG. 1 is a perspective view that schematically illustrates a position detection magnet according to an embodiment of the invention. FIG. 2 is a plan view that schematically illustrates the position detection magnet viewed from a magnet side. FIG. 3 is a sectional view taken along the line III-III of FIG. 2. FIG. 4 is a side view observed in the direction of IV shown in FIG. 2. FIG. 5 is a plan view that schematically illustrates an yoke positioned on a magnetizing tool according to an embodiment of the invention. FIG. 6 is a diagram that schematically illustrates a magnetizing coil according to an embodiment of the invention. FIG. 7 is a diagram that explains the detection accuracy of the position detection magnet. FIG. 8 is a diagram that schematically illustrates the layout of magnetic detection elements in a position detection apparatus according to an embodiment of the invention. FIG. 9 is a diagram that schematically illustrates a position detection example for the layout illustrated in FIG. 8. FIG. 10 is a diagram that schematically illustrates the layout of a shift range of a vehicle for the layout illustrated in FIG. 8.

As illustrated in FIG. 1, in the structure of a position detection magnet according to the present embodiment of the invention, a magnet (which may be referred to as "position detection magnet") 6 that has the shape of a flat plate is fixed to an yoke 9. The yoke 9 also has the shape of a flat plate. As illustrated in FIGS. 2 and 3, the magnet 6 has a peripheral side part 6a and a center part 6b. The magnetic polarity of the peripheral side part 6a of the magnet 6 is opposite to the magnetic polarity of the center part 6b thereof as shown in FIG. 3. Magnetic lines of force that flow out from N poles of the front surface of the position detection magnet 6 converge at an adjacent S pole as illustrated in FIG. 7. The magnetic lines of force that have converged at the S pole flow in the position detection magnet 6 to reach the opposite N pole formed at the reverse-face side of the position detection magnet 6. The N pole and the S pole at the front surface and the reverse face make up a pair of magnetic poles. Then, the magnetic lines of force that have reached the opposite N pole further flow through a magnetic path inside the yoke 9. Thereafter, the magnetic lines of force enter the opposite S poles of the position detection magnet 6 at the reverse face thereof. In the magnetic-flow operation explained above, the yoke 9 has a function of shutting off magnetic lines of force coming toward the opposite S poles at the reverse face and another function of offering a magnetic path through which magnetic lines of force flow inside the yoke 9. With the structure of the position detection magnet according to the present embodiment of the invention, the borderline of the Hall output level 0V of a Hall element extends from the X-directional border between the peripheral side part 6a of the magnet 6 and the center part 6b thereof in a direction roughly perpendicular to the front surface of the magnet 6. In addition, since a flow passage for magnetic lines of force is formed inside the yoke 9, a magnetic force does not leak outward from the opposite N pole at the reverse face, thereby making it possible to prevent the magnetic loss of the position detection magnet 6.

As explained earlier, in the structure of a position detection magnet of related art, magnetic lines of force converge at the side part of an yoke. A dimensional gap that varies exists between the side part of the yoke and the side part of a magnet. Since the positional relationship between the side part of the yoke and the side part of the magnet varies in the X and Z directions, the position of the borderline of the Hall output level 0V of a Hall element and perpendicularity to the surface of the magnet vary. In contrast, in addition to offering the same function offered by such a position detection magnet of related art, a position detection magnet according to the present embodiment of the invention includes the peripheral side part 6a and the center part 6b that are formed next to each other with magnetic polarities opposite to each other. Magnetic lines of force that flow out from the center part 6b converge at the peripheral side part 6a. Since the positional relationship between the peripheral side part 6a and the center part 6b is substantially free from variation both in the X and Z directions, it is possible to make variation in the position of the borderline of the Hall output level 0V of a Hall element and variation in perpendicularity substantially smaller than those of the related art. In addition, since it suffices that the yoke 9 has a function of shutting off magnetic lines of force at the reverse face of the position detection magnet 6 and another function of offering an inner magnetic path for magnetic lines of force from the peripheral side part 6a to the center part 6b, it is not necessary to bend the yoke 9 for the converging of magnetic lines of force at the magnet-surface side of a bent-erected part, which requires high bending precision. As for the positional relationship between the yoke 9 and the position detection magnet 6, the only thing needed is to set and fix the yoke 9 onto the reverse face of the position detection magnet 6 along therewith. Therefore, precise positional control is not required. As explained above, magnetic lines of force that flow out from N poles of the front surface of the position detection magnet 6 converge at an adjacent S pole (poles). The magnetic lines of force that have converged at the S pole, one of a pair of magnetic poles, flow in the position detection magnet 6 to reach the opposite N pole formed at the reverse-face side of the position detection magnet 6, that is, the other of the pair of magnetic poles. Then, the magnetic lines of force that have reached the opposite N pole further flow through a magnetic path inside the yoke 9. Thereafter, the magnetic lines of force enter the opposite S poles of the position detection magnet 6 at the reverse face thereof. Therefore, a magnetic force does not leak outward from the opposite N pole at the reverse-face side, thereby making it possible to prevent the magnetic loss of the position detection magnet 6 by means of a flat yoke 9. As a matter of course, it is not always necessary that the yoke 9, which serves to prevent or reduce the loss of a magnetic force, should be made of iron.

Figure 11:
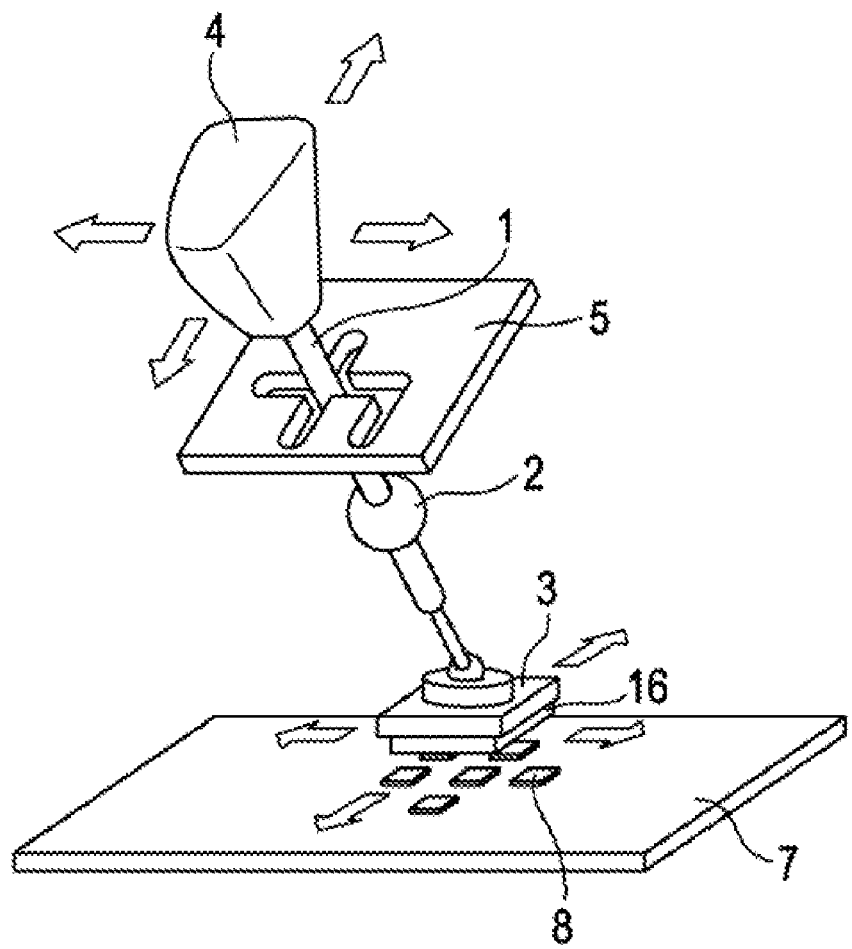
FIG. 11 is a perspective view that schematically illustrates an example of a vehicle's shift position detection apparatus.
Figure 12:
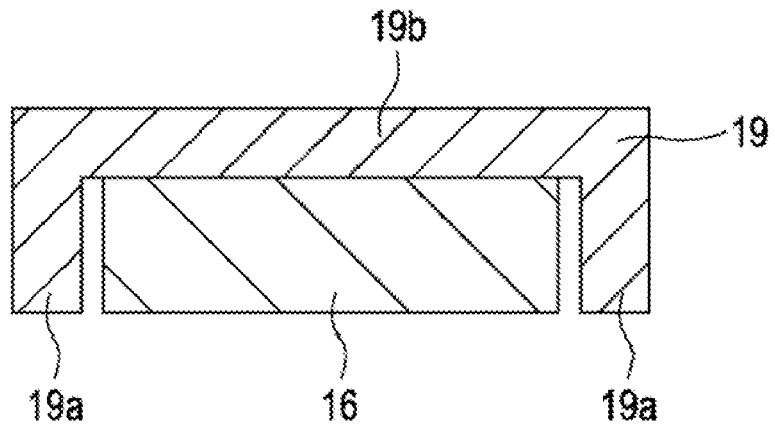
FIG. 12 is a side view that schematically illustrates an example of a magnet for position detection according to related art.
Figure 13:
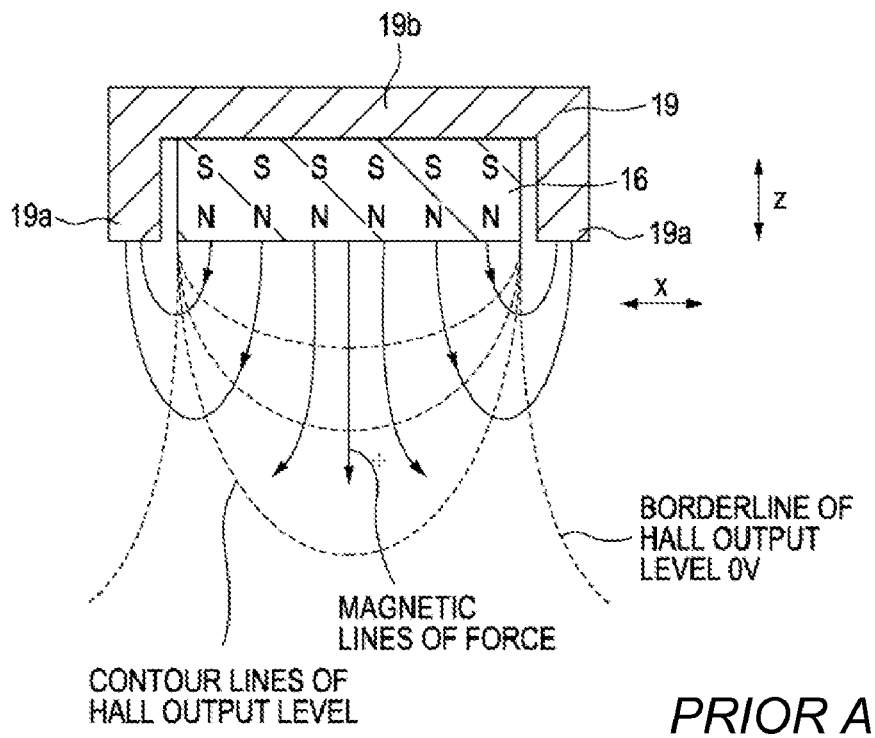
FIG. 13 is a diagram that explains the detection accuracy of the related-art position detection magnet.

As illustrated in FIGS. 3 and 7, the peripheral side part(s) 6a of the magnet 6 is formed at a regional range that can be defined on the basis of predetermined distances a and a' (where a may be equal to a') measured from the respective side edges (i.e., ends) of the yoke 9. For this reason, the borderlines of the Hall output level 0V described above are formed at predetermined line positions measured from the respective side edges of the yoke 9. When the position detection magnet 6 is mounted onto the position detection apparatus illustrated in FIG. 11, the side edges of the yoke 9 are taken as positioning references for fixation to the magnet holder 3. Accordingly, the positions of reference points for positioning the magnet 6 with respect to the magnet holder 3 can be determined with great accuracy, which makes the alignment (i.e., position adjustment) of the magnet 6 in the position detection apparatus easier.

As illustrated in FIGS. 1 and 4, some parts of the magnet 6 are formed as fixation parts 6c, which are projections that penetrate through the yoke 9 for fixing the magnet 6 to the yoke 9. In addition, as illustrated in FIGS. 2 and 4, dented step parts 6d are formed at respective edges of the magnet 6 as a surface level difference. When the magnet 6 is mounted onto the magnet holder 3, the magnet holder 3 directly holds the step parts 6d, thereby preventing the magnet 6 from coming off from the magnet holder 3. The magnet holder 3 holds the magnet 6 together with the yoke 9. The magnet 6 is mounted at the Hall-element side, that is, relatively close to the Hall elements (as the magnetic detection elements) 8 in comparison with the iron yoke 9. The magnet holder 3 provided at the surface side of the iron yoke 9 holds them. Since the iron yoke 9 has the shape of a flat plate, a distance between the magnet 6 and the Hall elements 8 is not affected significantly. Therefore, high position detection precision is ensured.

Next, a method of manufacturing the position detection magnet 6 having the above structure is explained below. A position detection magnet according to the present embodiment of the invention can be manufactured as follows. As a first step, a flat magnetic body is formed through outsert molding on the yoke 9 to make up an integral body. In the formation of the magnetic body, a bond magnet material containing magnetic powder of Ferrite, rare earth, etc., is used. Next, the magnetic body is subjected to magnetizing processing (i.e., polarizing processing) with the side edges of the yoke 9 taken as reference positions. The yoke 9 has a plurality, which is an appropriate number, of holes. In the process of the outserting of the bond magnet material, the material is filled in these holes. The aforementioned fixation parts 6c of the magnet 6 that protrude beyond the reverse face of the yoke 9 are formed at the same time. By this means, the magnet 6 is fixed to the yoke 9.

Various well-known manufacturing methods other than the above outsert molding may be used as an alternative method for manufacturing a flat magnetic body that is formed on the yoke 9 to make up a single-piece body. As for precision in the relative alignment of the yoke 9 and the magnetic body, it suffices that the magnet holder 3 can directly hold the step parts 6d of the magnet 6. A magnetizing apparatus that includes a magnetizing tool 10 and a magnetizing coil 14 is used for magnetizing the peripheral side part of the magnetic body with the side edges of the yoke 9 taken as reference positions. The magnetizing tool 10 is schematically illustrated in FIG. 5. The magnetizing coil 14 is schematically illustrated in FIG. 6. The magnetizing tool 10 has alignment parts 10a and 10b for positioning the yoke 9. In addition, the magnetizing tool 10 has a peripheral side part 11a and a center part 11b. The peripheral side part 11a of the magnetizing tool 10 corresponds to the peripheral side part 6a of the magnet 6. The center part 11b of the magnetizing tool 10 corresponds to the center part 6b of the magnet 6. The magnetizing tool 10 has a gateway slit 12 through which the magnetizing coil 14 is routed between the peripheral side part 11a and the center part 11b. In the structure of the magnetizing apparatus, the magnetizing coil 14 is routed through the gateway slit 12 and around the peripheral side part 11a as illustrated in FIG. 6. The magnetic body formed on the yoke 9 to make up an integral body is attached to the magnetizing apparatus. When the body is attached to the magnetizing apparatus, end faces of the yoke 9 are fitted in contact with the alignment parts 10a and 10b of the magnetizing tool 10 as illustrated in FIG. 5. Then, the magnetizing coil 14 is charged for magnetizing the body. As a result, the peripheral side part 11a and the center part 11b of the magnetizing tool 10 are magnetized with polarities opposite to each other so as to correspond to the peripheral side part 6a and the center part 6b of the magnet 6, respectively. The magnetization is always carried out after the alignment of the yoke 9 on the magnetizing tool 10. For this reason, the peripheral side part 6a of the magnet 6 is always formed at a regional range that can be defined on the basis of predetermined distances a and a' (where a may be equal to a') measured from the side edges of the yoke 9.

Needless to say, the peripheral side part 6a can be formed not only with the predetermined distances a and a' in the vertical direction of FIG. 2 but also with predetermined horizontal distances in the same manner as above. Therefore, it is possible to achieve positional detection with high precision in the two-dimensional X-Y directions.

As illustrated in FIG. 2, a position detection magnet according to the present embodiment of the invention has the shape of a quadrangle in a plan view. However, the shape of the position detection magnet 6 is not limited to a quadrangle. For example, in some cases, a circular position detection magnet offers higher position detection precision, which depends on the array positions of magnetic detection elements and the manner of movement of the position detection magnet 6 with respect to the array positions of the magnetic detection elements. The position detection magnet 6 may be formed as a circular position detection magnet if it is advantageous to do so.

Next, a position detection apparatus that uses the position detection magnet 6 having the above structure is explained below. For example, the position detection magnet 6 is attached to the magnet holder 3 of the vehicle's shift lever position detection apparatus illustrated in FIG. 11. The side edges of the yoke 9 are taken as positioning references for fixation to the magnet holder 3. The plurality of Hall elements 8 is provided on the substrate 7 shown in FIG. 11 as magnetic detection elements. The layout of the Hall elements (as the magnetic detection element) 8 is illustrated in FIG. 8. In the illustrated example of FIG. 8, one Hall element 8 is provided at each of six shift-range positions of a vehicular shifting device illustrated in FIG. 9. That is, the Hall element 8 is provided at each of the six positions for an auto/manual switchover range (A/M), a shift up range (+), a shift down range (−), a drive range (D), a neutral range (N), and a reverse range (R). More specifically, as illustrated in FIG. 8, one of the six Hall elements 8 that is denoted as 8(A/M) is provided at the auto/manual switchover position. Another Hall element 8(+) is provided at the shift up position. Another Hall element 8(−) is provided at the shift down position. Another Hall element 8(D) is provided at the drive position. Another Hall element 8(N) is provided at the neutral position. The other Hall element 8(R) is provided at the reverse position. The shift up range (+) and the shift down range (−) are enabled when the "manual" of the auto/manual switchover range is selected.

When an operator moves the gearshift knob 4 fixed to an end of the shift lever 1 to the lower right position for selecting the reverse range (R), the position detection magnet 6 that is held by the magnet holder 3 with positional alignment also moves in accordance with the movement of the gearshift knob 4 in an interlocked manner. The position detection magnet 6 stops at the reverse shift position (R) among the positions of a magnet movement pattern illustrated in FIG. 10. When the position detection magnet 6 stays at the reverse position (R), the Hall element 8(R) only is set ON. The selection of the reverse range (R) by means of the gearshift knob 4 is detected as a result of the detection of an ON signal corresponding to the Hall element 8(R). In this example, the movement direction of the shift lever 1 is restricted to the vertical direction and the horizontal direction only. Accordingly, the position detection magnet 6 also moves in the vertical direction and the horizontal direction only.

Therefore, the Hall elements 8 for detecting the position of the magnet 6 are arrayed as illustrated in the layout of FIG. 8. When the movement direction of a position detection target member is restricted to the vertical direction and the horizontal direction only, it is advantageous to form the position detection magnet 6 as a quadrangular position detection magnet because a quadrangular magnet offers higher position detection precision at each position in comparison with a circular magnet and magnets having other planar shapes for such H-and-V-restricted movement. That is, the quadrangular magnet is advantageous in terms of reliable detection sensitivity as the borderline of the Hall output level 0V is perpendicular to the movement direction (that is, the borderline of the Hall output level 0V constitutes a plane perpendicular to the movement direction). If the position detection target member moves in six directions, it is advantageous to form the position detection magnet 6 as a hexagonal position detection magnet. In this case, each of six sides of the hexagon should be perpendicular to the corresponding one of the six movement directions.

As explained above, the position detection elements 8 such as the Hall elements are arrayed on a surface opposite the movement plane of the position detection magnet 6, which is provided at the front end of the shift lever 1. The shift lever 1 is an example of a position detection target member according to an aspect of the invention. The position detection magnet 6, which is a magnet for position detection, has the structure explained above. With these features, it is possible to detect the movement position of the position detection target member accurately.

In the manufacturing of a position detection magnet according to the present embodiment of the invention, a flat magnetic body is formed with the use of a bond magnet material through outsert molding on the yoke 9 to make up an integral body. However, the method of manufacturing the position detection magnet is not limited to the above example. For example, a flat magnetic body may be molded as a separate magnetic member, which is thereafter bonded to the yoke 9. Precise position alignment for the bonding of the magnetic body to the yoke (i.e., precise bonding-position alignment) is not necessary. Regardless of whether an integral molding method, a separate formation method, or any other manufacturing method is used, a magnetization area is set accurately with the side edges of the yoke 9 taken as reference positions because the end faces of the yoke 9 are fitted in contact with the alignment parts 10a and 10b of the magnetizing tool 10. Therefore, it is possible to provide a magnet that achieves high position detection precision and is easy to manufacture. In addition, it is possible to provide a position detection apparatus that features high position detection precision.

In the foregoing description of an exemplary embodiment of the invention, a shifting device for vehicular use is taken as an example of a position detection apparatus according to an aspect of the invention. Notwithstanding the foregoing, needless to say, an apparatus that uses a combination of a magnet and magnetic detection elements can be applied to various known apparatuses, including but not limited to, a joystick input device, a sliding-type multi-direction input switch, and a sliding-type two direction switch.

What is claimed is:

1. A position detection magnet formed on a flat yoke for magnetic loss reduction,
   wherein the magnet is fixed to a flat surface of the flat yoke, the magnet comprising:
   a center part; and
   a peripheral part surrounding the center part,
   wherein magnetic polarity of the peripheral part is opposite to magnetic polarity of the center part, and
   wherein the center part and the peripheral part of the magnet are magnetized in a fixed state in which the magnet is fixed to the yoke and in an aligned state in which the yoke is aligned onto a magnetizing tool.

2. A position detection apparatus comprising:
   a position detection target member;
   a magnet that moves in accordance with movement of the position detection target member; and
   a magnetic detector that is provided on a surface opposite a movement plane of the magnet,
   wherein a surface of the magnet is in contact with a surface of a flat yoke for magnetic loss reduction,
   the magnet includes a center part and a peripheral part that is formed around the center part,
   magnetic polarity of the peripheral part is opposite to magnetic polarity of the center part, and
   the magnet has a flat magnetic body, and the center part and the peripheral part of the magnet are magnetized in a fixed state in which the flat magnetic body is fixed to the yoke and in an aligned state in which the yoke is aligned onto a magnetizing tool.

3. The position detection magnet according to claim 1, wherein a boundary between the peripheral part and the center part lies at a predetermined distance from an end of the yoke.

4. The position detection apparatus according to claim 2, wherein a boundary between the peripheral part and the center part lies at a predetermined distance from an end of the yoke.

5. The position detection apparatus according to claim 2, wherein the magnet has a surface that is perpendicular to a direction of movement of the magnet.

6. The position detection apparatus according to claim 4, wherein the magnet has a surface that is perpendicular to a direction of movement of the magnet.

7. The position detection apparatus according to claim 2, wherein the magnet has a surface that is perpendicular to a direction of movement of the magnet.

8. The position detection magnet according to claim 1, wherein the magnet has a substantially flat magnetic body including the center part and the peripheral part.

9. The position detection magnet according to claim 1, wherein the yoke has a plurality of holes, the magnet further comprising:
   fixation parts protruding from an opposite surface of the yoke though the plurality of holes.

10. The position detection magnet according to claim 2, wherein the magnet has a substantially flat magnetic body including the center part and the peripheral part.

11. The position detection magnet according to claim 2, wherein the yoke has a plurality of holes, the magnet further including:
    fixation parts protruding from an opposite surface of the yoke though the plurality of holes.

12. A position detection apparatus, comprising:
    a position detection target member;
    a magnet configured to move in accordance with movement of the position detection target member; and
    a magnetic detector provided on a surface opposite a movement plane of the magnet,
    wherein the magnet is fixed to a surface of a flat yoke for magnetic loss reduction,
    the magnet includes a center part and a peripheral part surrounding the center part,
    magnetic polarity of the peripheral part is opposite to magnetic polarity of the center part, and
    the magnet has a flat magnetic body, and the center part and the peripheral part of the magnet are magnetized in a fixed state in which the flat magnetic body is fixed to the yoke and in an aligned state in which the yoke is aligned onto a magnetizing tool.

* * * * *